United States Patent
Bohn et al.

(10) Patent No.: US 8,893,543 B2
(45) Date of Patent: Nov. 25, 2014

(54) LEAK DETECTION METHOD

(75) Inventors: Martin Bohn, Cologne (DE); Norbert Rolff, Kerpen (DE); Jochen Puchalla, Bergheim (DE); Michael Dauenhauer, Köln (DE)

(73) Assignee: Inficon GmbH, Cologne (DE)

( * ) Notice: Subject to any disclaimer, the term of this patent is extended or adjusted under 35 U.S.C. 154(b) by 229 days.

(21) Appl. No.: 13/142,981

(22) PCT Filed: Dec. 15, 2009

(86) PCT No.: PCT/EP2009/067196
§ 371 (c)(1),
(2), (4) Date: Jul. 28, 2011

(87) PCT Pub. No.: WO2010/079055
PCT Pub. Date: Jul. 15, 2010

(65) Prior Publication Data
US 2011/0283769 A1 Nov. 24, 2011

(30) Foreign Application Priority Data

Jan. 8, 2009 (DE) .......................... 10-2009-004363

(51) Int. Cl.
*G01M 3/04* (2006.01)
*G01M 3/22* (2006.01)
*G01M 3/20* (2006.01)

(52) U.S. Cl.
CPC .............. G01M 3/202 (2013.01); G01M 3/226 (2013.01)

USPC ........................................................ 73/40.7

(58) Field of Classification Search
CPC ........ G01M 3/202; G01M 3/226; G01M 3/20; G01N 1/24
USPC ...................................... 73/40.7, 40
See application file for complete search history.

(56) References Cited

U.S. PATENT DOCUMENTS

| | | | | |
|---|---|---|---|---|
| 3,757,587 A * | 9/1973 | Ahnsorge | ........................ | 73/45.4 |
| 4,459,844 A * | 7/1984 | Burkhart | ........................ | 73/40.7 |
| 5,131,263 A * | 7/1992 | Handke et al. | ................. | 73/40.7 |
| 5,661,229 A * | 8/1997 | Bohm et al. | ................... | 73/40.7 |
| 6,314,793 B1 | 11/2001 | Webb et al. | | |
| 7,905,132 B1 * | 3/2011 | Chamberlain | ................. | 73/40.7 |
| 8,176,770 B2 * | 5/2012 | Wetzig | ............................ | 73/40.7 |
| 2008/0035202 A1 * | 2/2008 | Lee et al. | ......................... | 137/10 |

FOREIGN PATENT DOCUMENTS

JP  2005-121481 A  5/2005
WO  2005/054806 A1  6/2005

* cited by examiner

*Primary Examiner* — John Fitzgerald
*Assistant Examiner* — David Z Huang
(74) *Attorney, Agent, or Firm* — Craig Metcalf; Kirton McConkie

(57) ABSTRACT

A leak detection method using a specimen filled with a test gas positioned in front of a suction opening. Air is suctioned along the entire surface of the specimen and takes up test gas in the case of a leak. The test gas is recognized by a test gas detector. According to the invention, full mobility of the specimen is ensured during the testing process so that the leak detection method can be carried out while the specimens are moving past the suction opening.

17 Claims, 2 Drawing Sheets

LEAK DETECTION METHOD

Figure 1:
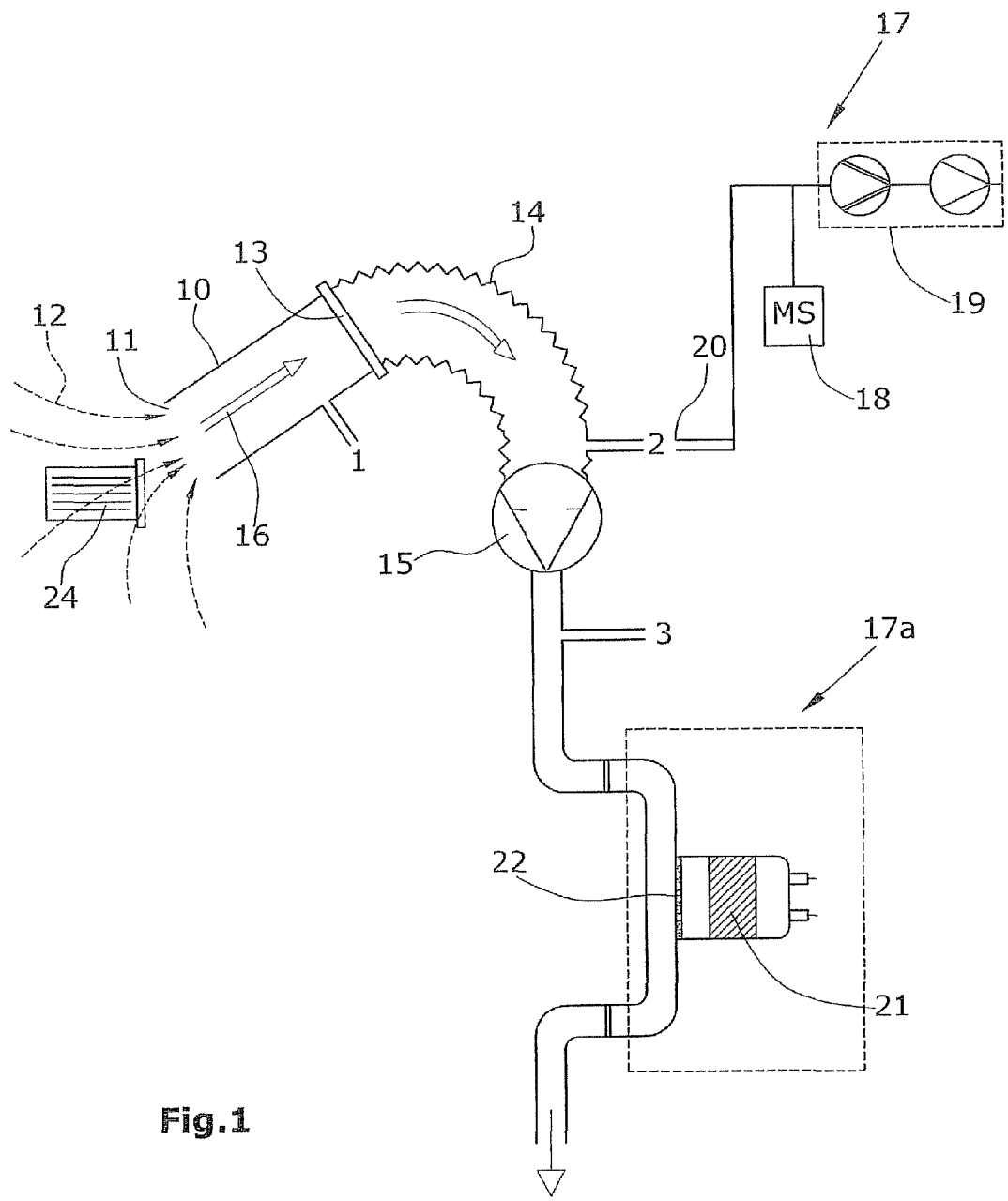

This application is a National Stage of International Application No. PCT/EP2009/067196, filed Dec. 15, 2009, and entitled LEAK DETECTION METHOD, which claims the benefit of DE 10 2009 004363.2, filed Jan. 8, 2009. This application claims priority to and incorporates herein by reference the above-referenced applications in their entirety.

The invention relates to a leak detection method wherein a specimen filled with a test gas is exposed to an air flow and said air flow or a partial flow thereof is tested for the presence of the test gas.

Methods for leak detection wherein the specimen, i.e. the object to be tested for a leak, is filled with a test gas, are already known. The specimen is placed in a leak-tight chamber through which a carrier gas will be passed. After the carrier gas has left the chamber, the gas will be tested for the presence of test gas. Such a method is described in WO 2005/054806 A1 (Sensistor Technologies AB). This method requires that the specimen is placed in a sealable chamber, the interior of said chamber being sealed against the atmosphere.

In JP 2005-121481 (Denso), a leak detection method is described wherein the specimen is inserted into a wedge-shaped chamber, the tip of said wedge being connected to a suction device and the broad end being open toward the atmosphere and covered only by a filter. Via said filter, air is suctioned into the interior while flowing along the specimen. Test gas leaking to the outside from the interior of the specimen will be detected by a test gas detector which is supplied with a partial flow of the gas suctioned from the chamber.

A precondition of the known leak detection methods is the existence of a chamber enclosing the specimen, which chamber is either sealed against the ambience in a pressure-tight manner or is pneumatically connected to the ambience. In each case, the need exists for a chamber accommodating the specimen.

Further known are sniffer leak detectors which are suited for testing a non-enclosed specimen. Sniffer leak detectors comprise a rod-shaped thin probe for suctional intake of ambient air. Said probe is connected to a test gas detector which is capable of detecting the presence of test gas in the suctioned gas. Such a sniffer leak detector inevitably has a narrowly limited spatial detection area. This detector is provided not only for detecting the presence of a leak but also for identifying the site of the leak. Upon detection of a leak, the site of the leak will be identified on the basis of the site occupied by the probe tip at the time that a leak is detected. Thus, it lies in the nature of this leak detection method that the spatial detection area of the sniffer leak detector is very closely delimited.

It is an object of the invention to provide a leak detection method by which a leak detection can be performed without any restriction of the movability of the specimen and without the need for an enclosure.

The leak detection method according to the present invention is defined by claim 1. It is characterized in that, in the ambient atmosphere, the air flow is passed across substantially the entire surface of the non-enclosed specimen in the form of an undirected flow exclusively by suctioning.

By the term "undirected flow", it is meant that the air flow is moved along the surface of the specimen alone by the suction, without being influenced by deflector plates or by similar guiding means. The surface of the specimen 24 is freely accessible at all sites.

According to the invention, the specimen will be exposed, without any enclosure, to an air flow which is suctioned into a large-dimensioned suction opening. The suction opening has a diameter larger than 5% of the largest diameter of the specimen. By the large suction opening, it is safeguarded that the suctioned air flow will brush over substantially all outer surfaces of the specimen, so that a leak existent on the specimen can be detected in each position, although without localizing the site of the leak on the specimen.

The invention is also particularly suited for leak detection on movable specimens. The invention makes it possible to examine passing products, as are manufactured in mass production, during their movement. Such products are e.g. pumps or vessels which will be filled with a test gas, particularly helium, at overpressure. According to the method of the invention, these products will be tested for leaks in an integral manner.

The method of the invention also makes it possible to integrally test a complete region of a production plant for the existence of leaks on the specimens without enclosing the respective testing area.

Test gas detection can be performed either on the whole air flow or on a partial flow thereof. If a partial flow is branched off from the air flow, this partial flow can be either supplied to a mass spectrometer or to a quartz window sensor which is selectively responsive to the test gas.

The air flow has a relatively high flow rate of at least 100 normal $cm^3$ per second and particularly at least 1 normal liter per second. The diameter of the suction tube is correspondingly large and is at least 5 cm, particularly at least 10 cm.

Embodiments of the invention will be explained in greater detail hereunder with reference to the drawings.

Figure 2:
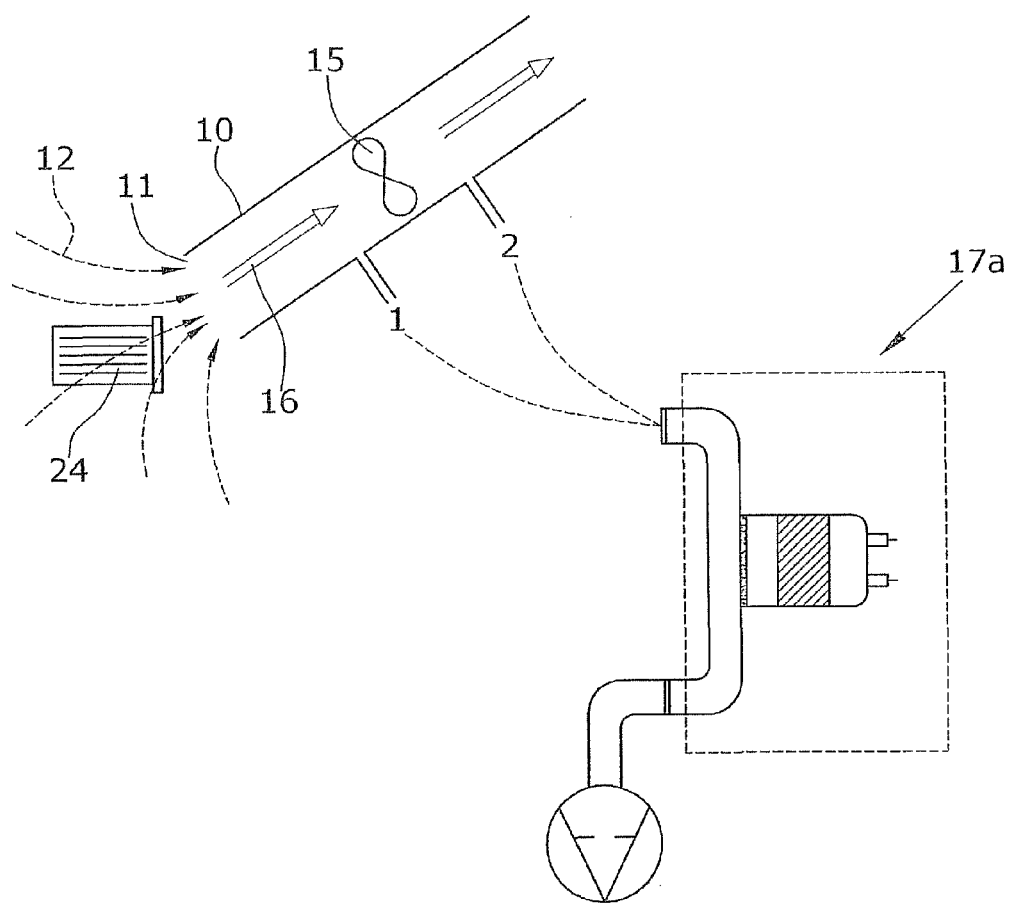

In the drawings, the following is shown:

FIG. 1 is a schematic view of a first embodiment of the leak detection method, and FIG. 2 is a schematic view of a second embodiment of the leak detection method.

In the method according to FIG. 1, a suction tube 10 of a relatively large diameter is provided. The diameter is at least 5 cm, particularly at least 10 cm. Via the suction opening 11 on one end of suction tube 10, ambient air will be suctioned, which is visualized by the arrows 12. The ambient air is suctioned without any air guide means, thus being suctioned into the suction tube not only axially but also with lateral components as indicated by the arrows 12.

The downstream end 13 of the suction tube is connected, via a flexible hose 14, to a conveyor unit 15 provided for propelling the air flow 16.

Along the course of the air flow 16, partial-flow extraction sites 1, 2 and 3 are provided, each of them adapted for connection of a test-gas detector 17 to it. One such test-gas detector 17 is illustrated at the partial-flow extraction site 2. Said detector comprises a mass spectrometer 18 connected to a vacuum pump 19. The inlet 20 of the test-gas detector 17 will be connected to the partial-flow extraction site.

Partial-flow extraction site 1 is arranged at suction tube 10, partial-flow extraction site 2 is arranged on hose 14 and upstream of conveyor unit 15, and partial-flow extraction site 3 is arranged downstream of conveyor unit 15.

FIG. 1 further illustrates a test-gas detector 17a designed as a quartz-window detector. Such a quartz-window detector is described in DE 100 31 882 A1. Said sensor comprises a casing 21 closed by a membrane 22. The membrane 22 is selectively permeable to the test gas, e.g. helium. In the interior of casing 21, a pressure sensor is arranged. The gas flow will sweep along said membrane 22. In case that test gas is included in the gas flow, this test gas will pass through membrane 22 and enter the casing 21. Internally of the casing, the pressure will increase, which will be indicated by a measurement gauge. The functionality of the quartz-window detector does not necessitate a vacuum in the area of the specimen.

The specimen 24 is arranged, in the ambient atmosphere, in front of the suction opening 11 so that the complete surface of the specimen will be subjected to the air flow. The specimen is filled with test gas (helium). If a leak exists, the test gas will enter the air flow and be entrained by it.

To ensure that the air flow will brush over the complete surface of the specimen, the cross-sectional area of suction opening 11 should amount to at least 10% of the projection surface of the specimen onto the plane of the suction opening. Particularly, the cross-sectional area should be at least 20% of said projection surface.

The testing can be carried out while the specimens 24 are being moved continuously or discontinuously past the suction opening 11. Thus, the method of the invention is also applicable in serial or mass production. There is also the option of testing a whole area or batches of specimens for possible leaks by moving the suction tube 10 to the specimens. This is rendered possible by the flexible hose 14.

In the embodiment according to FIG. 2, the conveyor unit 15 is provided in the form of a ventilator in the interior of suction tube 10. A hose, as provided in the first embodiment, does not exist here. Each one of the extraction sites 1,2 is adapted for connection of a test gas detector 17a. In FIG. 2, a sensor of the quartz-window type is shown while, however, also a mass-spectrometric sensor could be used. The extraction sites 1,2 can be arranged upstream or downstream of the conveyor unit 15.

Further, the possibility exists to provide a collar around the suction opening. The invention allows for a high flexibility in leak testing. The invention primarily serves for detecting the mere existence of leaks, without performing a localization of a leak on the specimen.

The invention claimed is:

1. A leak detection method that employs a suction tube, that is coupled to a conveyor unit via a flexible hose, to generate an air flow, wherein a non-enclosed specimen filled with a test gas is exposed to the air flow, wherein, in the ambient atmosphere, the air flow is passed across substantially the entire surface of the non-enclosed specimen in the form of an undirected flow exclusively by suctioning into the suction tube, wherein the suction tube includes a first partial-flow extraction site that branches off from the suction tube, and the flexible hose includes a second partial-flow extraction site that branches off from the flexible hose downstream from the first partial-flow extraction site, each partial-flow extraction site having connected thereto a test-gas detector and a vacuum pump for diverting the partial flow of the air flow to the corresponding test-gas detector such that each partial flow is tested independent of any other partial flow.

2. The leak detection method of claim 1, wherein the specimen is positioned in front of a suction opening of the suction tube, said suction opening being operative to suction air from the atmosphere past the specimen.

3. The leak detection method of claim 1, wherein the cross-sectional area of the suction opening is at least 10% of the projection surface of the specimen onto the plane of the suction opening.

4. The leak detection method of claim 1, further comprising a third partial flow extraction site that is positioned downstream of the conveyor unit that creates the suction.

5. The leak detection method of claim 1, wherein at least one of the test-gas detectors comprises a mass spectrometer.

6. The leak detection method of claim 1, wherein at least one of the test-gas detectors comprises a quartz window sensor.

7. The leak detection method of claim 1, wherein the suction tube has an internal diameter of at least 2 cm.

8. The leak detection method of claim 1, wherein the suction tube has an internal diameter of at least 5 cm.

9. The leak detection method of claim 1, wherein the air flow has a flow rate of at least 100 normal $cm^3$ per second.

10. The leak detection method of claim 1, wherein the air flow has a flow rate of at least 1 normal liter per second.

11. The leak detection method of claim 1, wherein the specimen is moved continuously or discontinuously past a suction opening of the suction tube.

12. The method of claim 1, further comprising:
identifying a projection surface of the non-enclosed specimen; and
configuring an opening of the suction tube to have a cross-sectional area of at least 10% of the projection surface.

13. The method of claim 12, wherein the cross-section area of the opening is configured to be at least 20% of the projection surface.

14. A leak detector comprising:
a suction tube coupled to a conveyor unit by a flexible hose, the conveyor unit for suctioning ambient air containing a test gas into the suction tube and through the flexible hose, the conveyor unit causing an air flow of the ambient air that passes across substantially an entire surface of a non-enclosed specimen in the form of an undirected flow;
a first partial flow extraction site that branches off from the suction tube at a first location along the suction tube;
a first test-gas detector connected to the first partial flow extraction site;
a first vacuum pump connected to the first partial flow extraction site, the first vacuum pump causing a first partial flow of the ambient air to be diverted from the suction tube into the first partial flow extraction site, the first test-gas detector configured to detect the presence of any test gas within the first partial flow of the ambient air;
a second partial flow extraction site that branches off from the flexible hose at a second location along the flexible hose, the second location being downstream from the first location;
a second test-gas detector connected to the second partial flow extraction site; and
a second vacuum pump connected to the second partial flow extraction site, the second vacuum pump causing a second partial flow of the ambient air to be diverted from the flexible hose into the second partial flow extraction site, the second test-gas detector configured to detect the presence of any test gas within the second partial flow of the ambient air such that the first and second test gas detectors independently test for test gas within separate first and second partial flows of the ambient air.

15. The leak detector of claim 14, further comprising:
a third partial flow extraction site positioned at a third location downstream from the second location;
a third test-gas detector connected to the third partial flow extraction site; and
a third vacuum pump connected to the third partial flow extraction site, the third vacuum pump causing a third partial flow of the ambient air to be diverted into the third partial flow extraction site, the third test-gas detector configured to detect the presence of any test gas within the third partial flow of the ambient air such that the first, second, and third test gas detectors independently test for test gas within separate first, second, and third partial flows of the ambient air.

16. The leak detector of claim 14, wherein at least one of the test-gas detectors is a quartz-window detector.

17. The leak detector of claim 14, wherein at least one of the test-gas detectors is a mass-spectrometer.

* * * * *